United States Patent [19]

Thomas et al.

[11] Patent Number: 5,293,731
[45] Date of Patent: Mar. 15, 1994

[54] LAWN MOWER

[75] Inventors: W. Roger Thomas, Stockton-on-Tees; Vincent Carr, Heighington, both of England

[73] Assignee: Black & Decker Inc., Newark, Del.

[21] Appl. No.: 907,096

[22] Filed: Jul. 1, 1992

[30] Foreign Application Priority Data

Jul. 3, 1991 [GB] United Kingdom ............ 9114434.5

[51] Int. Cl.[5] .................................................. A01D 34/82
[52] U.S. Cl. ........................................ 56/11.3; 56/16.9; 56/DIG. 4; 192/18 R
[58] Field of Search .............. 56/11.3, 11.9, 16.9, 56/17.4, DIG. 4, DIG. 6; 192/18 R, 18 B

[56] References Cited

U.S. PATENT DOCUMENTS

| 3,731,472 | 5/1973 | Kamlukin ............................ 56/11.3 |
| 3,897,678 | 8/1975 | Zurek et al. ........................ 56/11.3 |
| 3,967,438 | 7/1976 | Tombers ............................. 56/17.5 |
| 4,286,701 | 9/1981 | MacDonald ........................ 192/18 R |
| 4,313,293 | 2/1982 | Nagai ............................ 192/18 R X |
| 4,372,433 | 2/1983 | Mitchell et al. ................. 56/11.3 X |
| 4,388,988 | 6/1983 | MacDonald .................... 192/18 R X |
| 4,511,023 | 4/1985 | Nagai ............................... 192/18 R |
| 4,524,853 | 6/1985 | Nagai ............................... 192/18 R |

FOREIGN PATENT DOCUMENTS

| 0288348 | 3/1988 | European Pat. Off. . |
| 1194615 | 8/1968 | United Kingdom . |
| 1391413 | 10/1973 | United Kingdom . |
| 2011732 | 11/1978 | United Kingdom . |
| 2013410 | 12/1978 | United Kingdom . |
| 2013467 | 2/1979 | United Kingdom . |
| 2066584 | 12/1980 | United Kingdom . |
| 2221103 | 7/1989 | United Kingdom . |

OTHER PUBLICATIONS

Soviet Inventions Illustrated, Sections EI, Week 8129 Derwent Publications Limited, London, GB SU-A-773 842 (Baukov)-abstract.
Patent Abstracts of Japan, vol. 7, No. 163 (M-229) (1308) JP-A-58 070 092-abstract, Oct. 1981.

Primary Examiner—Terry Lee Melius
Attorney, Agent, or Firm—Dennis A. Dearing; Charles E. Yocum; Edward D. C. Bartlett

[57] ABSTRACT

A braking system for a rotary mower includes a brake element which is secured to an impeller and is urged by a spring normally into braking engagement with a fixed brake friction member. On start-up of a motor of the mower, rotation of the impeller causes axial movement of the brake element against the spring and out of braking engagement. Movement of the brake element may be assisted by mechanical means, for example by a multiple ball and ramp system or arrangement. In this embodiment, four equally spaced balls are normally located in ramped recesses formed in an upper face of an adaptor element, such that on start-up of the motor, the balls ramp up at least partially out of the recesses, and assist in urging a braking element and a friction element out of braking engagement with one another. This assist stops when the motor is turned off, the balls now moving back into their respective lowest positions in the recesses formed in the upper face of the adaptor element.

20 Claims, 4 Drawing Sheets

Fig_2

Fig_3

LAWN MOWER

BACKGROUND OF THE INVENTION

The present invention relates to an improved braking system which is particularly suitable for use with a lawn mower of the rotary type in which a blade and an impeller are rotated about a common axis by a motor, which may be an electric motor or a petrol motor.

For safety reasons, it is necessary to incorporate a braking system within the lawn mower, so that the blade and impeller are brought to a stop within a specified time. With the increased concern for safety, safety requirements are continually becoming more stringent, and it is now generally accepted that a stop time of less than 3 seconds is particularly desirable, and indeed is increasingly being required by statutory regulations in many countries.

Braking systems which are currently available for use on mowers of this type include electromechanical systems which are spring-loaded brake systems including a brake pad and a brake disc, the spring urging the pad and disc into braking contact and being opposed by the action of a solenoid.

For mowers of the type driven by induction motor, brakes of the type in which the magnetic field created in the rotor is used to hold a movable brake disc in an OFF position against the spring force while the motor is running have been proposed. In these systems, the magnetic field is energized only when the motor is energized.

Braking systems for electric motors are also known, which comprise an electromagnetically releasable spring-actuated brake with a braking surface, a brake disc driven in rotation, a release device non-rotatably secured to the braking surface, and an armature mounted non-rotatably and so as to be capable of axial displacement between the brake disc and the release device, and biased by springs against the brake disc. Such braking systems have been disclosed in connection with motors having substantially horizontally-mounted axles to be stopped.

In such braking systems, on energizing the motor the axle moves to separate the brake disc from its corresponding braking surface. On de-activating the motor, the spring urges the brake disc back into contact with the braking surface.

It is a disadvantage of the known electromechanical braking systems that they are expensive to manufacture and add significantly to the cost of each lawn mower. Where attempts have been made to reduce the cost of these systems by using part of the motor housing to provide part of the housing for the solenoid coil and spring, these systems only achieve a stop time in the order of 5 seconds, which is not sufficiently short to satisfy the more stringent safety requirements which require a stop time of less than 3 seconds by increasing the size of the brake disc, but this would lose part of the cost saving benefit.

Known electromagnetically releasable spring-actuated braking systems would not be suitable for use with a substantially vertical shaft, since the force generated by the magnetic field is not sufficient to hold the armature in its raised position under normal running conditions, after the initial surge observed when the motor is energized.

SUMMARY OF THE INVENTION

It is an object of the present invention to provide a braking system suitable for a lawn mower, in which the above disadvantages are reduced or substantially obviated.

The invention provides a braking system for a lawn mower, which system includes:

an impeller mounted for rotation about a shaft and movable in an axial direction relative to the axis of that shaft;

a brake element mounted for rotation with the impeller;

a brake friction element which is restrained from rotation; and resilient means for urging the brake element in an axial direction into braking contact with the friction element.

In a preferred embodiment of the braking system according to the present invention, means are provided for lifting the impeller on start-up of the motor, to release the braking contact between the brake element and the friction element.

The means for lifting the impeller on start-up of the motor may, for example, be a mechanical system such as an angled drive dog or ball and ramp arrangement, or may be an electromagnetic system, such as the electromagnetically-releasable spring actuated system described above in connection with the braking of horizontally-mounted axles.

BRIEF DESCRIPTION OF THE DRAWINGS

The present invention will now be further described with reference to the accompanying drawings, of which

DESCRIPTION OF THE PREFERRED EMBODIMENTS

Figure 1:
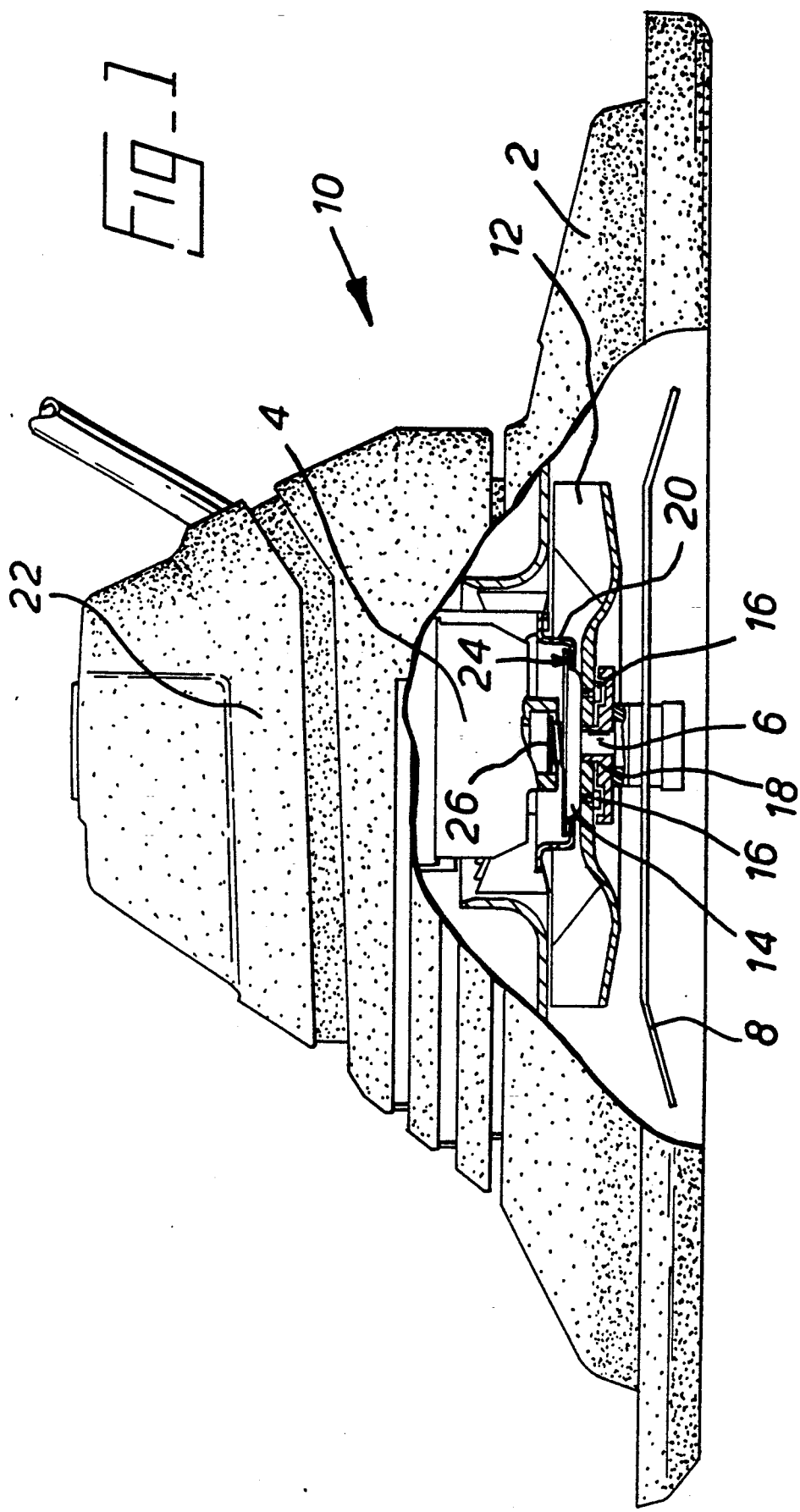
FIG. 1 is a side elevational view, partially in section, of a lawn mower having a first embodiment of a braking system according to the present invention.
Figure 2:
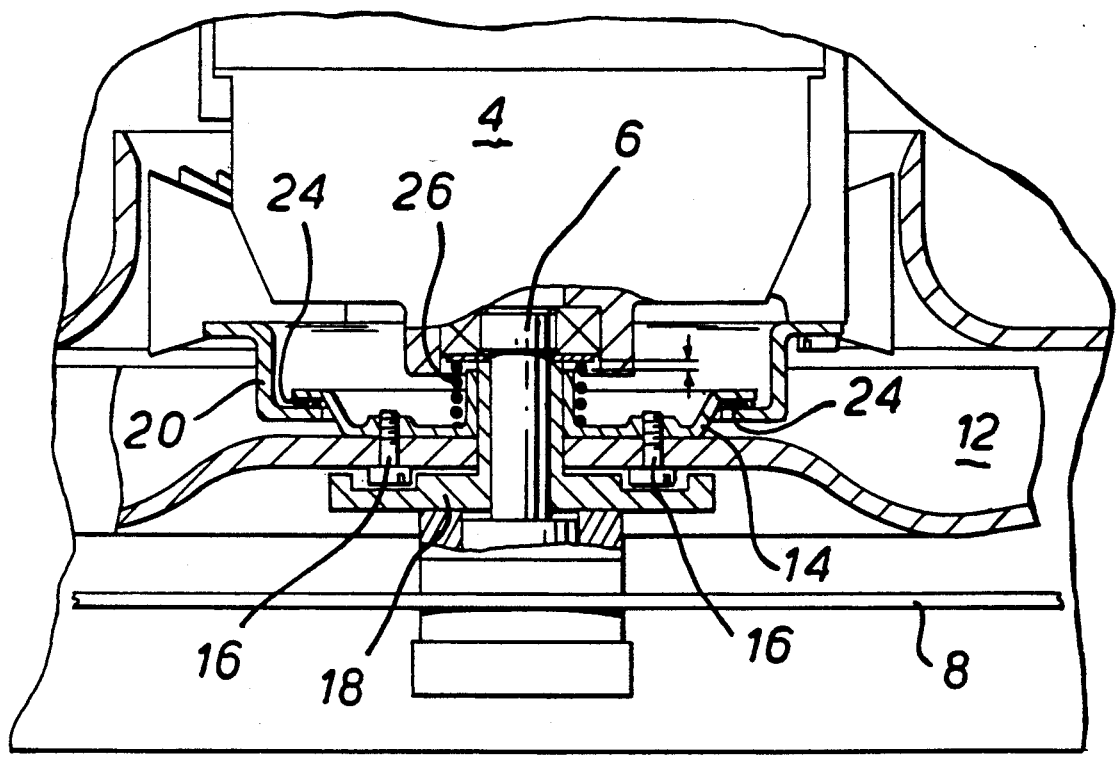
FIG. 2 is an enlarged sectional detail view of the lawn mower of FIG. 1.

Referring to FIGS. 1 and 2, the rotary lawn mower 10 includes a deck 2 on which a series electric motor 4 is mounted. The motor 4 is provided with an output shaft 6 on which is fitted a blade 8 and impeller 12. A brake disc 14 is attached by means of screws 16 to the impeller 12. The impeller 12 and disc 14 assembly is slidably mounted on the output shaft 6, by means of an adaptor 18, so that the assembly is free to move in an axial direction a predetermined distance "d" (FIG. 2) relative to the shaft 6. An annular brake friction plate 20 is secured to a housing 22 of the motor 4. Brake friction pads 24 are attached to an inner circular flange portion 25 of the brake friction plate 20.

A spring 26 is provided to normally urge the brake disc 14 downwardly into braking contact with the pads 24 on the brake friction plate 20.

In operation, as the motor 4 is energized, the impeller 12 is driven by the output shaft 6 and begins to rotate.

As the speed of rotation increases, a pressure differential is built up due to the rotation of the impeller 12, and the pressure on the motor side of the impeller 12 falls sharply, tending to draw the assembly comprising the impeller 12 and brake disc 14 toward the motor 4 against the action of the spring 26. This removes the braking contact between the brake disc 14 and brake friction plate 20 so that the impeller 12 and blade 8 are free to rotate.

When the motor 4 is switched off, the impeller 12 is no longer driven by the output shaft 6 and the speed of rotation reduces sharply. This has the effect of reducing the pressure differential between the two surfaces of the impeller, equalizing the rotational forces on the impeller. The force of the spring 26 is no longer opposed by the suction force generated by the rotating impeller 12 and urges the brake disc 14 and brake friction plate 20 into braking contact, thus braking the system.

Figure 3:
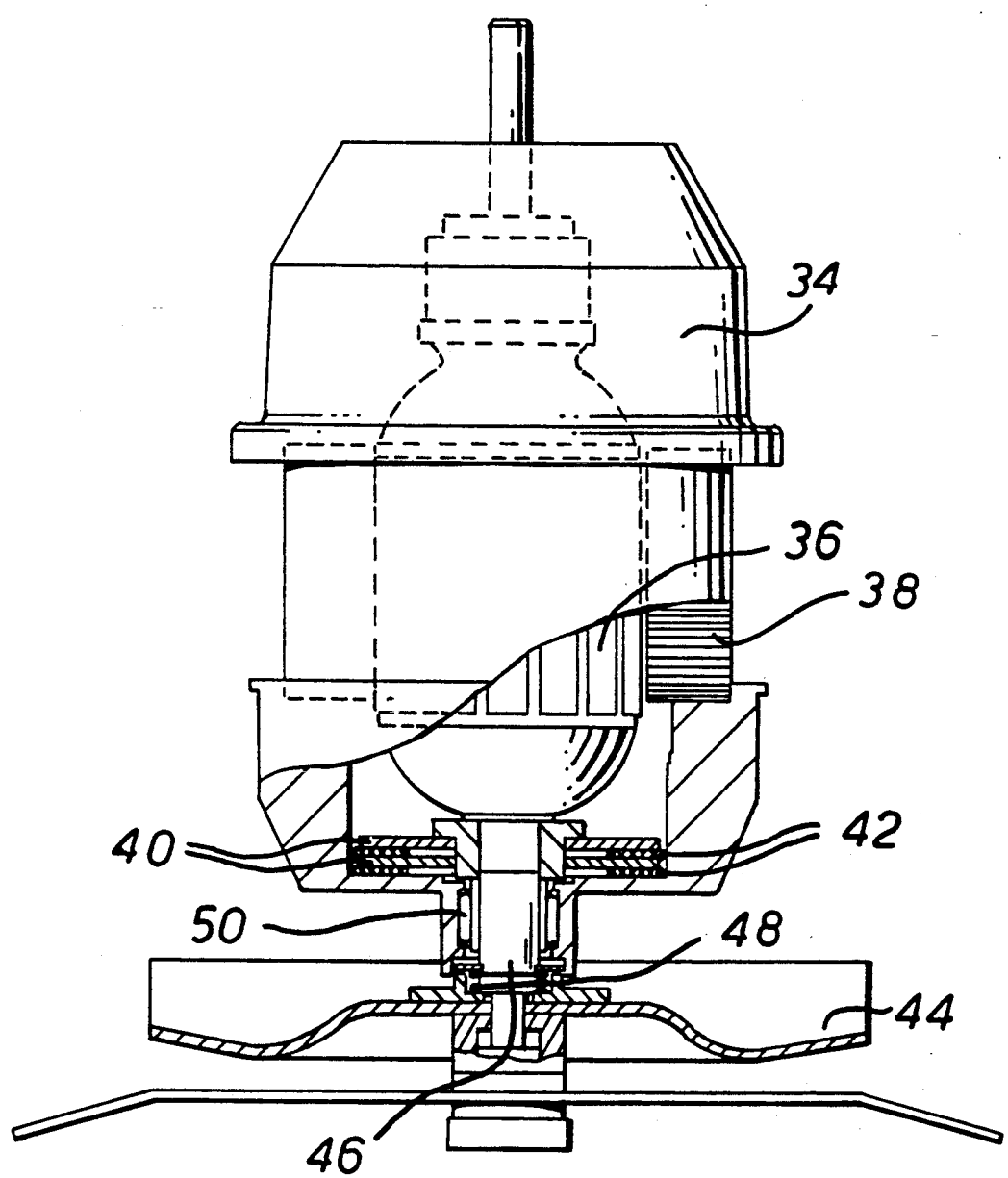
FIG. 3 is a side elevational view, partially in section, of a second embodiment of a braking system according to the present invention.

In a second embodiment shown in FIG. 3, the mower is provided with an additional means for releasing the brake on initial start-up of the motor. The motor 34 includes an armature 36 rotatably mounted within a stator 38. The armature 36 is mounted so that it is able to move axially with respect to the stator 38. Spaced steel discs 40 are mounted to rotate with the armature 36, and friction pads 42 are positioned in the spaces between the steel discs 40. The friction pads 42 are fixed in the motor housing 22 against rotation but are free to move axially. An impeller 44 is mounted on the output shaft 46 and is urged by a spring 48 away from the armature 36 and associated steel discs 40 and brake pads 42. Needle roller bearings 50 are provided, and allow the shaft 46 to rotate and move freely in the axial direction.

In the non-running position, the magnetic field of the armature 36 is offset relative to that of the stator 38. In operation, as the motor 34 is energized, there is an initial surge in current and hence in the magnetic field. The offset arrangement of the respective magnetic fields of the armature and stator causes the armature to lift (in the direction indicated by arrow 51 in FIG. 3) relative to the stator and release the braking contact. The speed of rotation of the impeller then increases and the pressure effects described with respect to the first embodiment of the braking system, come into force. When the motor is deenergized, the armature 36 "drops" in a direction opposite to that shown by arrow 51, and braking contact is re-instituted.

Figure 4:
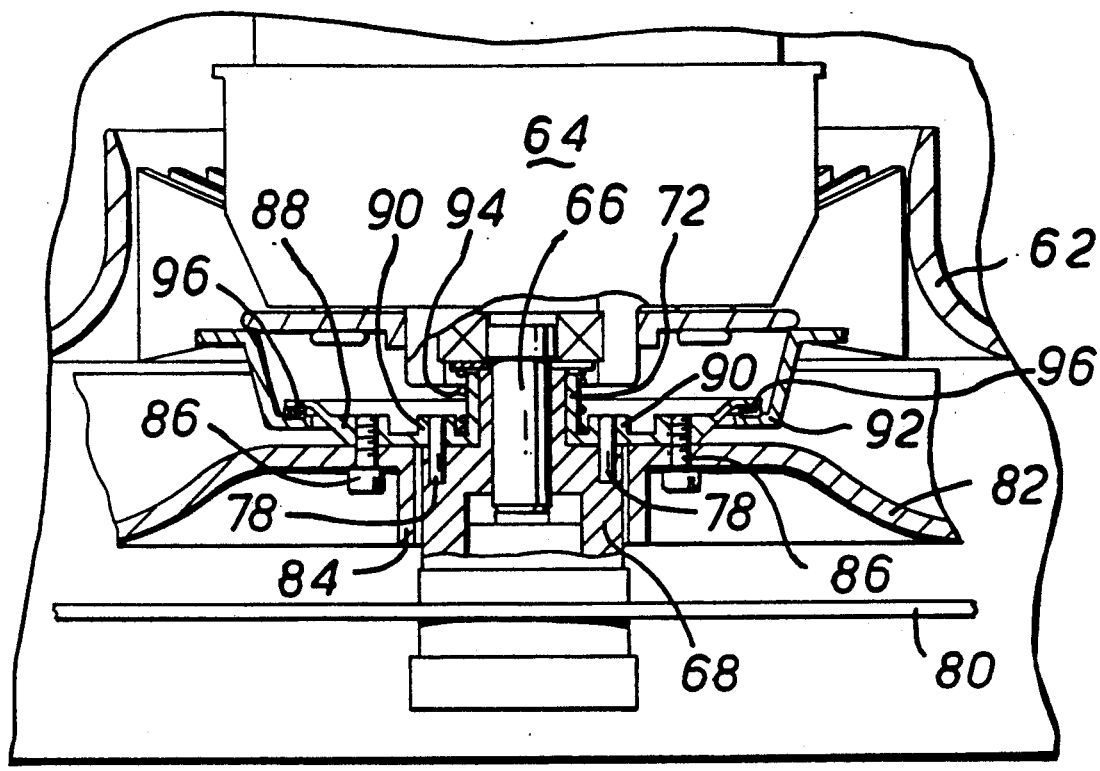
FIG. 4 is a side elevational view, partially in section, of a third embodiment of a braking system according to the present invention.
Figure 5:
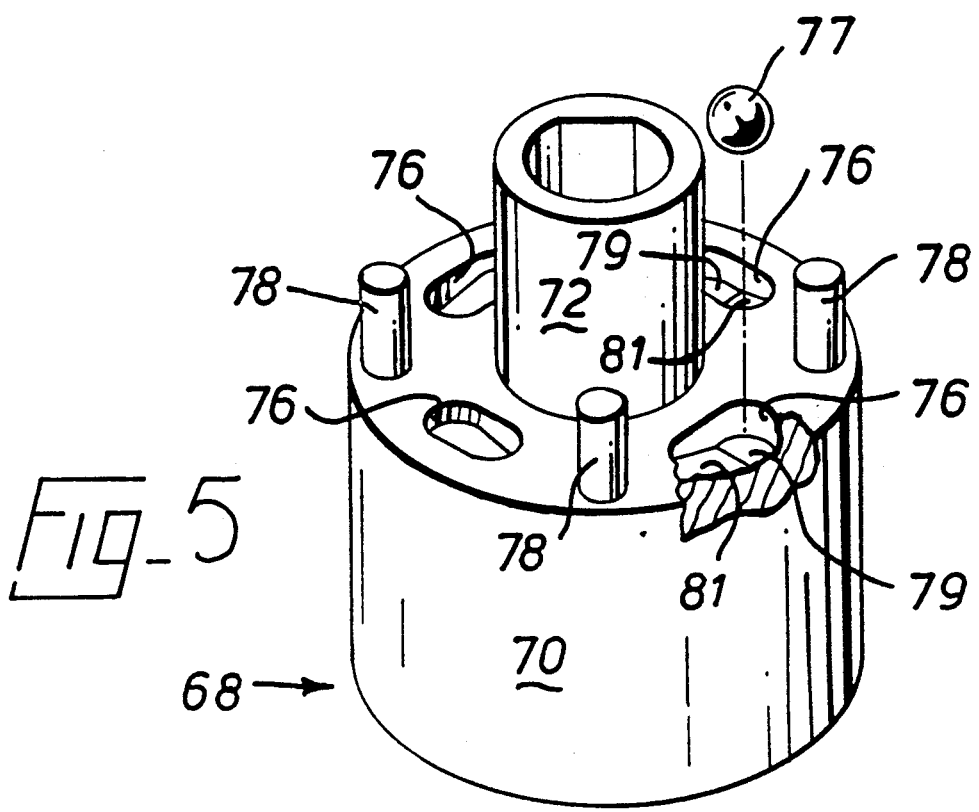
FIG. 5 shows an adaptor used in the braking system of FIG. 4.

A third embodiment is shown in FIGS. 4 and 5.

FIG. 4 shows a deck 62 on which a motor 64 is mounted. The motor 64 includes an output shaft 66 on which is secured an adaptor 68. Referring now to FIG. 5, the adaptor 68 includes a cylindrical body 70 from which extends a sleeve 72. In an upper surface 74 of body 70, four bearing recesses 76 are formed which support ball bearings 77 (one of which being shown schematically in FIG. 5 for purposes of illustration). Referring to the partially cut-away portion of adaptor 68 in FIG. 5, each recess includes a floor or lower surface 79 intersecting an upwardly-inclined ramp surface 81. Finally, four axially-extending hardened steel pins 78 are secured to the adaptor surface 74.

A blade 80 is secured to the shaft 66 for rotation therewith. An impeller 82 has a sleeve portion 84 which surrounds the body 70 of the adaptor 68, and is secured by screws 86 to a dished brake disc 88. The disc 88 includes bosses 90 defining bores 91 therein which fit over adaptor pins 78. The assembly of impeller 82 and brake disc 88 is thus constrained to rotate with the shaft 66 and adaptor 68, but can move axially relative to them.

An annular brake friction plate 92 is secured to a housing of the motor 64, and a spring 94 urges the brake disc 88 downwardly into braking contact with brake pads 96 on the brake friction plate 92.

It can be seen that the operation of the third embodiment is similar to that of the first embodiment, save that on the first rotary impulse given to the adaptor 68, the balls 77 are caused to ride up from the lower surfaces 79 up the ramp surfaces 81 and thereby urged against brake disc 88. This assists in moving the assembly of the impeller 82 and brake disc 88 upward to release the braking effect between the disc 82 and the friction plate 92.

The present invention has been disclosed in connection with specific embodiments. However, it will be apparent to those skilled in the art that variations from the illustrated embodiments may be undertaken without departing from the spirit and scope of the invention.

What is claimed is:

1. A braking system for a lawn mower, comprising:
   a motor drivingly connected to a rotatable shaft;
   an air impeller mounted for rotation on and with said shaft and movable in an axial direction relative to the axis of said shaft;
   a brake element mounted for rotation with the impeller;
   a friction element which is connected to a housing of said lawn mower and restrained from rotation;
   resilient means for urging the brake element in an axial direction into braking contact with the friction element;
   a cutting blade mounted on said shaft for rotation therewith, the cutting blade being spaced axially along said shaft from said air impeller; and
   said air impeller being formed to produce an air flow upon rotation by said shaft, said air flow creating a force on said air impeller to move said air impeller axially in opposition to said resilient means to disengage said brake element from said friction element.

2. A braking system according to claim 1, further comprising means, in addition to said airflow, for lifting the impeller on start-up of the motor to release said braking contact between the brake element and the friction element.

3. A braking system according to claim 2, wherein the means for lifting the impeller includes an electromagnetically-releasable spring-actuated system.

4. A braking system according to claim 2, wherein the means for lifting the impeller includes an angled drive dog.

5. A braking system according to claim 2, wherein said means for lifting the impeller further includes a multiple ball and ramp system operatively associated with said brake element and said friction element, such that on start-up of the motor, balls move on ramps to urge said brake and friction elements out of braking contact.

6. A lawn mower, comprising:
   a deck;
   a motor supported by said deck;
   a drive shaft rotatably driven by said motor;
   a blade connected to said drive shaft for rotation therewith;
   an air impeller mounted below said motor on said drive shaft, said impeller being rotatable with and movable axially relative to said drive shaft, said impeller upon rotation by said motor creating a pressure differential from one side of said impeller to the other with the pressure on the side of the motor falling and drawing the impeller towards said motor against the action of said spring;

a spring urging said impeller axially away from said motor;

a stationary brake element connected to said deck and restrained against rotation;

a rotatable brake element mounted on said impeller for rotation and axial movement therewith;

said rotatable brake element being urged into braking contact with said stationary braking element by said spring; and rotation of said impeller upon starting of said motor causing said impeller to lift said rotatable brake element away from said stationary brake element.

7. The lawn mower of claim 6, wherein said blade is mounted on an adapter, said impeller is slidable axially on said adapter, and said impeller is between said motor and said blade.

8. The lawn mower of claim 6, wherein said stationary brake element comprises a friction plate attached to said motor and surrounding said drive shaft.

9. The lawn mower of claim 8, wherein is said rotatable brake element comprises a brake disc secured to an upper side of said impeller.

10. The lawn mower of claim 6, further comprising lifting means for lifting said impeller towards said motor, said lifting means operating independently of said pressure differential upon starting of said motor.

11. The lawn mower of claim 10, wherein said motor is an electric motor having an armature and a stator, and said lifting means comprises an electromagnetic system employing an offset arrangement of respective magnetic fields of the armature and the stator.

12. The lawn mower of claim 10, wherein said lifting means comprises a ball and ramp system associated with said stationary and rotatable brake elements, the ball moving along and up the ramp upon starting of said motor to axially move said rotatable brake element away from said stationary brake element.

13. The lawn mower of claim 12, wherein said ramp is formed in an adaptor upon which said impeller is axially slidable, and said ball is disposed between said ramp and said rotatable brake element.

14. The lawn mower of claim 6, including an adaptor mounted on said drive shaft for rotation therewith, said impeller being mounted on said adaptor for rotation therewith.

15. The lawn mower of claim 14, wherein said adaptor is non-movably secured to said drive shaft, and said impeller is axially movable relative to said adaptor and said drive shaft.

16. The lawn mower of claim 14, wherein said impeller is axially movably on said adaptor, and pins carried by said adaptor slidably engage in bores in said rotatable brake element.

17. A lawn mower, comprising:

a deck;

a motor supported by said deck a drive shaft rotatably driven by said motor;

a blade and an impeller mounted on said drive shaft below said deck with said impeller disposed between said blade and said deck;

said blade and said impeller being rotatable with said drive shaft, and said impeller being axially displaceable along said drive shaft;

a friction plate secured to said deck and surrounding said drive shaft;

a brake disc secured to said impeller and surrounding said drive shaft;

a spring acting upon said impeller and said brake disc to urge said brake disc into braking engagement with said friction plate;

said impeller upon rotation by said motor creating a pressure differential from one side of said impeller to the other with pressure on the side nearest said deck falling and drawing said impeller axially along said drive shaft towards said deck against the action of said spring to lift said brake disc away from said friction plate; and means, operative independently of and in addition to said pressure differential created by said impeller, for lifting said brake disc away from said friction plate upon start up of rotation of said motor.

18. The lawn mower of claim 17, wherein an inner portion of said friction plate overlaps an outer portion of said brake disc, said friction plate and said brake disc being concentric with said brake disc being disposed inside said friction plate.

19. The lawn mower of claim 17, wherein said spring surrounds said drive shaft and is compressed between said motor and said brake disc.

20. The lawn mower of claim 17, wherein an adaptor is secured to a lower end of said drive shaft, an upper portion of said adaptor being axially slidably engaged by said impeller and said brake disc, and said blade being mounted on a lower portion of said adaptor.

* * * * *